J. M. STORM, Jr.
HAY RAKE ATTACHMENT.
APPLICATION FILED AUG. 4, 1914.
1,179,676.
Patented Apr. 18, 1916.
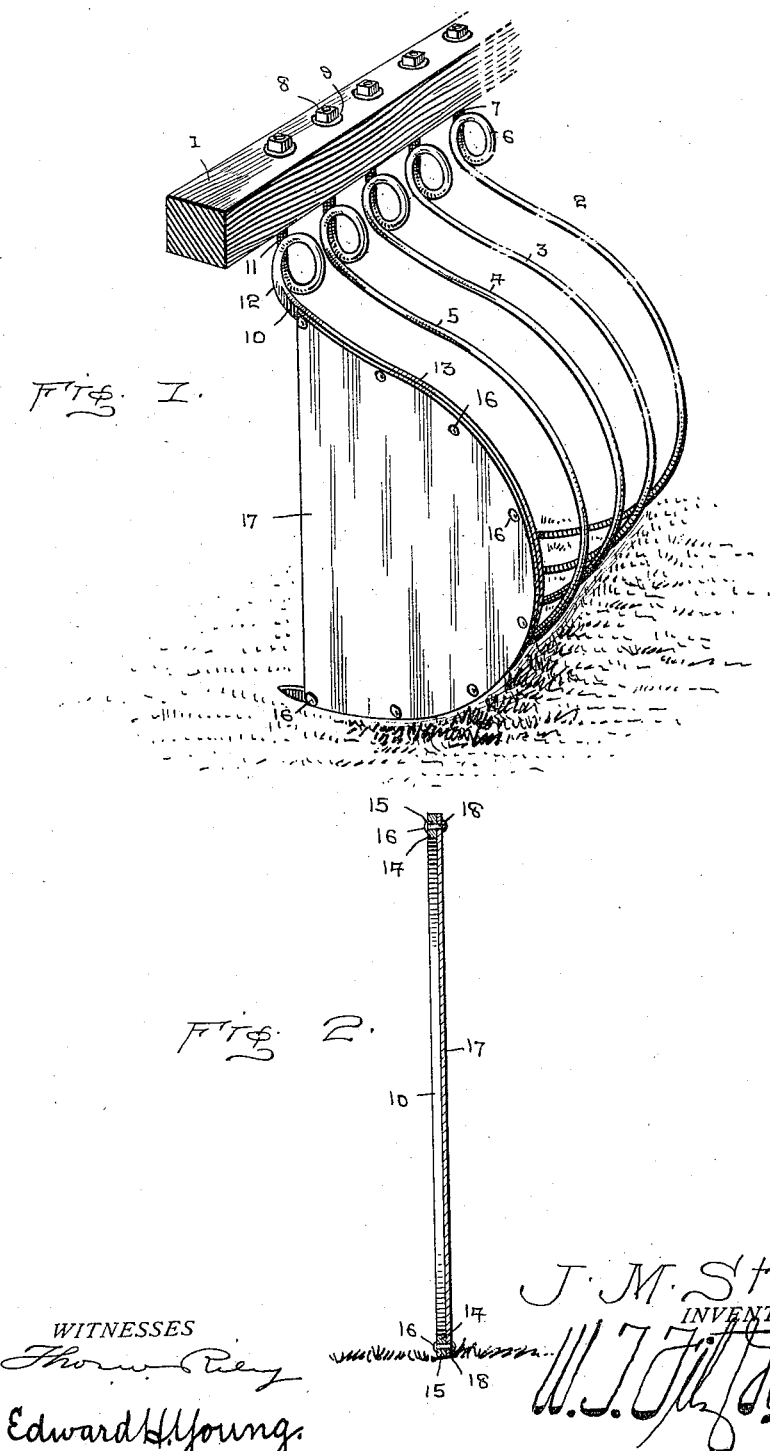

UNITED STATES PATENT OFFICE.

JAMES M. STORM, JR., OF NEW HAVEN, WYOMING.

HAY-RAKE ATTACHMENT.

1,179,676.  Specification of Letters Patent.  Patented Apr. 18, 1916.

Application filed August 4, 1914. Serial No. 854,955.

*To all whom it may concern:*

Be it known that I, JAMES M. STORM, Jr., a citizen of the United States, residing at New Haven, in the county of Crook and State of Wyoming, have invented certain new and useful Improvements in Hay-Rake Attachments; and I do hereby declare the following to be a full, clear, and exact description of the invention, such as will enable others skilled in the art to which it appertains to make and use the same.

My invention relates to new and useful improvements in attachments for hay rakes and particularly to that class known as horse drawn sulky rakes, and my object is to provide means in connection with the end teeth of the rake to prevent hay, or the like, from passing between the end teeth and the wheel of the rake. And a further object is to provide a special form of tooth at each end of the rake and means for securing the attachment thereto whereby a rigid structure will be provided.

Other objects and advantages will be hereinafter set forth and more particularly pointed out in the accompanying specification.

In the accompanying drawings which are made a part of this application, Figure 1 is a perspective view of a portion of a hay rake showing my improved attachment applied thereto, and Fig. 2 is a vertical transverse sectional view through the special form of tooth and parts attached thereto.

Referring to the drawings in which similar reference numerals designate corresponding parts throughout the several views, 1 indicates a rake beam to which are attached the ordinary form of rake teeth 2, 3, 4 and 5 which are similar in construction, said teeth having loops 6 formed therein and shank members 7 which extend through suitable apertures in the beam 1 and are locked thereon by means of nuts 8, a washer 9 being preferably placed between the base of the nut 8 and the beam 1.

The outermost tooth 10 at each end of the beam 1 is of special construction, said tooth having a shank portion 11 and loop portion 12, the same as the other teeth but the body portion 13 of said tooth is of a heavier structure than the other teeth and is substantially square in cross section as best shown at 14 in Fig. 2 of the drawing, thus forming a flat outer face on each of the end teeth practically their full length.

The teeth 10 are curved similar to the other teeth of the rake and a plurality of apertures 15 are formed transversely through the end teeth through which are to be disposed bolts 16 or like fastening means for securing a metallic plate 17 to the flat outer face of each end tooth, the plate 17 likewise having a plurality of openings 18 which register with the openings 15 in the tooth, the bolts 16 also passing through said apertures in the plate. By providing a number of the registering openings 15 and 18 and an equal number of bolts 16, an intimate contact is insured between the plate and the tooth whereby the latter will be held rigidly in position relative to the edge of the plate.

The forward edge of the plate 17 extends straight and substantially in vertical position, while the remaining edge portion of the plate is curved to conform to the contour of the tooth to which it is secured and by extending the straight or vertical edge of the plate at a point adjacent the forward ends of the fork, it will act as a shield to prevent the hay from passing between the end fork and the supporting wheel for the rake and will also hold the hay from entangling with the wheel.

What I claim as new and desire to secure by Letters Patent is:—

The herein described rake attachment comprising a plurality of intermediate curved spring teeth in combination with an outer tooth for each end of the rake, each outer tooth having a flattened outer side, said outer tooth also having at frequent intervals apertures therethrough, and a retaining plate having a straight front edge and a curved rear edge coinciding with the contour of the outer tooth, the rear edge of said plate being provided with apertures to register with the apertures in the outer tooth and a plurality of securing devices passing through said registering apertures in the tooth and plate whereby said tooth and plate will be held completely against relative movement.

In testimony whereof I have signed my name to this specification in the presence of two subscribing witnesses.

JAMES M. STORM, Jr.

Witnesses:
C. C. STORM,
Mrs. H. F. LESLIE.